Patented July 14, 1931

1,814,507

UNITED STATES PATENT OFFICE

CHARLES EDWIN GOULD, WILFRED MARSH HAMPTON, AND HAROLD SHARPE MARTIN, OF WEST SMETHWICK, ENGLAND, ASSIGNORS TO CHANCE BROTHERS AND CO. LIMITED, OF WEST SMETHWICK, ENGLAND

GLASS

No Drawing. Application filed March 14, 1929, Serial No. 347,170, and in Great Britain March 19, 1928.

This invention relates to glass of the kind which is especially transparent to ultra-violet radiation of the wave lengths below 3200 Angstrom units. One of the difficulties encountered with such glass as at present made is that it is subject to a kind of deterioration variously termed "fading", solarization or aging. It is found that after exposure to ultra-violet radiation the transparency to such radiation becomes diminished. Investigation has established that minute quantities of iron, titanium or vanadium oxides, or other deleterious substances in the glass cause absorption of ultra-violet radiation, and that the transparency of the glass is affected by the state of oxidation of such substances. Fading is due to changes from lower to higher states of oxidation of the deleterious substances.

We have found that the change of the oxides from the relatively harmless to the harmful condition under the action of ultra-violet radiation is associated with the presence of gaseous oxides, such as carbon dioxide, dissolved in the glass. These oxides usually occur as a result of the use of sodium or potassium carbonates or of the organic compounds which are sometimes employed, in the manufacture of glass, as reducing agents.

The object of the present invention is to minimize "fading", and for this purpose the invention comprises the employment in the manufacture of the glass, of ingredients which substantially avoid the occurrence in the finished glass of dissolved gaseous oxides.

In one manner of carrying the present invention into effect, we employ for the manufacture of the glass, in suitable proportions, such ingredients as silica, borax and a powdered metal (such as zinc, aluminium, or tin) which combines readily with oxygen and acts as a reducing agent and forms oxides which are stable and are transparent in the glass to ultra-violet radiations. One example of a glass made in accordance with this invention consists of the following ingredients in the proportions mentioned, namely, silica 560 parts, borax 527 parts and powdered zinc 8 parts. It will be understood, however, that these proportions may be widely varied.

By the use of such ingredients, deleterious gaseous oxides (for example carbon dioxide) are not produced, and consequently the harmful conversion of lower to higher oxides of small quantities of iron or other undesirable substances that may be present in the finished glass cannot occur. It is desirable as far as possible to employ anhydrous ingredients, but even when water is present in small quantities, glass made from such ingredients as those above mentioned has been found to be much less subject to "fading" than glasses of the compositions employed hitherto.

Having thus described our invention what we claim as new and desire to secure by Letters Patent is:—

1. A batch for making glass especially transparent to ultra-violet radiation of wave lengths below 3200 Angstrom units consisting of silica 560 parts, borax 527 parts and powdered metallic zinc 8 parts.

2. A glass batch for making glass permanently transparent to ultra-violet radiation in which the ingredients are silica, borax and a powdered metal, selected from the group consisting of zinc, aluminium and tin.

In testimony whereof we have signed our names to this specification.

CHARLES EDWIN GOULD.
WILFRED MARSH HAMPTON.
HAROLD SHARPE MARTIN.